March 6, 1934.  R. SEFTON  1,950,013
PNEUMATIC SPRING
Filed Nov. 28, 1931  2 Sheets-Sheet 1
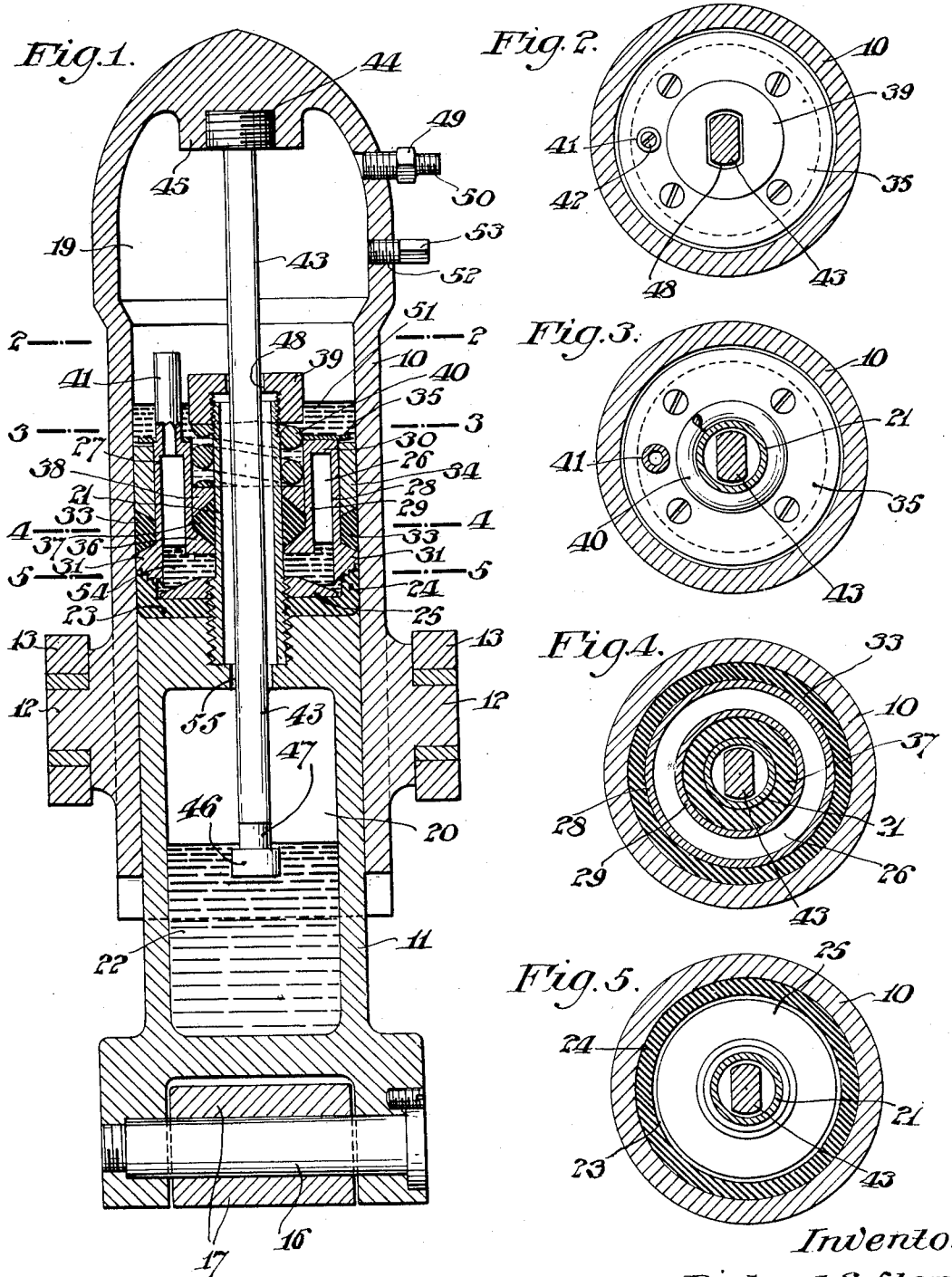
Inventor:
Richard Sefton,
By Jas. C. Hobensmith
Attorney.

March 6, 1934.   R. SEFTON   1,950,013
PNEUMATIC SPRING
Filed Nov. 28, 1931   2 Sheets-Sheet 2
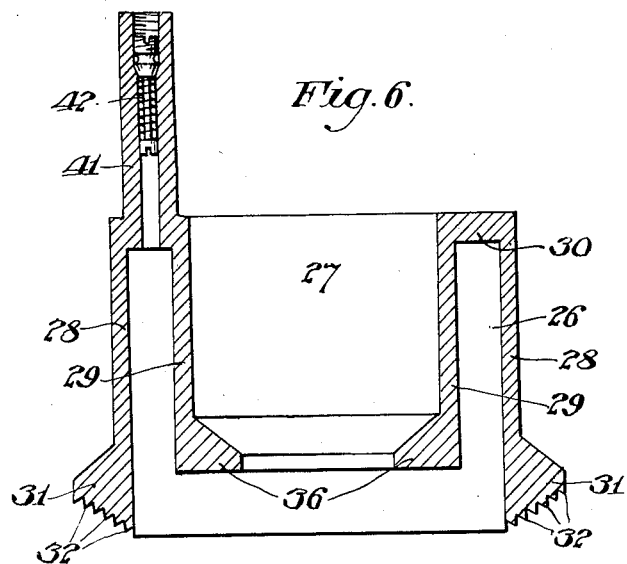
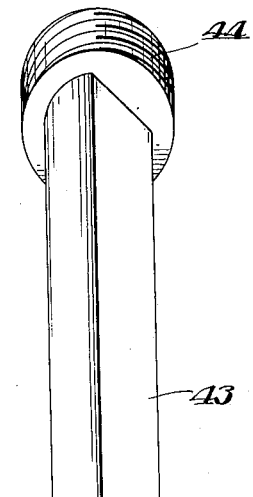
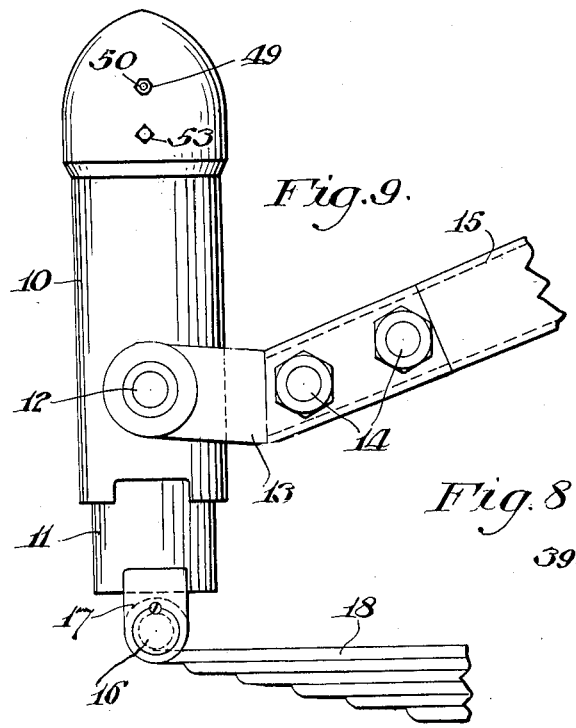
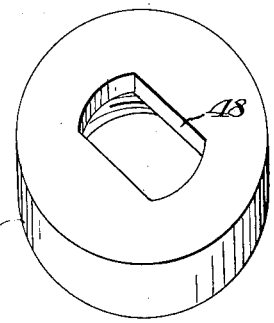
Inventor
Richard Sefton,
By Jas. C. Wobensmith
Attorney Patented Mar. 6, 1934

1,950,013

UNITED STATES PATENT OFFICE 1,950,013

PNEUMATIC SPRING

Richard Sefton, Cleveland, Ohio

Application November 28, 1931, Serial No. 577,765

14 Claims. (Cl. 267—65)

My invention relates to pneumatic springs, and it relates more particularly to a device which is adapted to be used in lieu of the shackles which are now commonly employed between the end of the spring and the supporting bracket of the chassis frame of an automobile, to act as an auxiliary spring, or shock resister.

The principal object of my invention is to provide an auxiliary pneumatic spring for motor vehicles and the like, which is simple and efficient, which is relatively inexpensive, and which is so constructed and arranged that leakage of the air is reduced to a minimum, to the end that the requisite air pressure will be properly maintained.

A further object of my invention is to provide a construction and arrangement whereby the device may be easily dismantled for the purpose of examination and repair when required, and readily adjusted, without dismantling, for the purpose of increasing the pressure on the sealing or packing members, in the event of leakage.

The nature and characteristic features of my invention will be more readily understood from the following description, taken in connection with the accompanying drawings forming part hereof, in which:

Figure 1 is a vertical, central, sectional view of a pneumatic spring embodying the main features of my present invention;

Fig. 2 is a horizontal section thereof, taken approximately on the line 2—2 of Fig. 1;

Fig. 3 is a horizontal section taken approximately on the line 3—3 of Fig. 1;

Fig. 4 is a horizontal section taken approximately on the line 4—4 of Fig. 1;

Fig. 5 is a horizontal section taken approximately on the line 5—5 of Fig. 1;

Fig. 6 is an enlarged central section of a member, detached, used for providing a high pressure air chamber for the purpose of increasing the efficiency of the engagement of a cup leather employed at the upper end of the piston;

Fig. 7 is an enlarged perspective view of a bolt member, detached, used for limiting the extent of the movement of the piston with respect to the cylinder, and for preventing improper separation thereof;

Fig. 8 is a perspective view of a gland member, detached, used in connection with the member shown in Fig. 6; and Fig. 9 is a side elevation, on a reduced scale, of the pneumatic spring, illustrating a preferred manner of connecting the same to the vehicle parts.

It will, of course, be understood that the drawings and description herein contained are illustrative merely, and that various modifications and changes may be made in the structure disclosed without departing from the spirit of the invention.

Referring to the drawings, in the particular embodiment of my invention therein shown, 10 is a cylinder, in which a hollow piston 11 is slidably mounted. The cylinder 10 is pivotally connected by means of trunnions 12 to brackets 13, which are secured in any suitable manner, such for example as by means of bolts 14, to a portion of the chassis frame 15 of the automobile, or other vehicle, in connection with which the device is used.

The lower end of the piston 11 is pivotally connected, by means of a bolt 16, to an eye 17 carried at the end of the upper member 18 of the leaf spring which is usually secured to the axle of the vehicle. The upper end of the cylinder 10 extends upwardly, to provide an internal air chamber 19.

The piston 11 is made hollow to provide an auxiliary chamber 20, which is in communication with the air chamber 19 provided in the top of the cylinder 10, by means of a tube 21, which is mounted in the top of the piston 11 and extends upwardly therefrom. The two air chambers thus provided in the top of the cylinder 10 and in the piston 11 are, together, of sufficient capacity to secure the requisite resiliency in the operation of the device.

Inasmuch as the weights of the vehicles to be supported vary considerably, a quantity of oil 22 may be placed in the chamber 20 of the piston 11, prior to the assembly of the structure, when it is desired to cut down the total air content of the two chambers.

Mounted upon the top of the piston 11 is a cup leather 23. The lip 24 of the cup leather 23 extends upwardly, and bears against the inner surface of the wall of the cylinder 10. The cup leather 23 is held in position on the top of the piston 11, by means of a disk 25, which is threaded on a continuation of the threads by means of which the tube 21 is mounted in the upper end of the piston 11.

A high pressure air chamber 26 is provided by a member 27, comprising a pair of concentric sleeves 28 and 29, united at the top by means of a horizontal wall 30. The lower end of the outer sleeve 28 of the member 27 is provided with a lip 31, the outer surface of which engages the wall of the cylinder 10.

The lower face of the lip portion 31 of the outer sleeve 28 of the member 27 is inclined, and provided with a series of annular ridges 32, which engage the upper complementally inclined face of the lip portion 24 of the cup leather 23, the ridges being provided so that, when pressure is imparted to the member 27, in the manner to be hereinafter set forth, said pressure will be exerted mainly in a downward direction upon the lip portion 24 of the cup leather 23.

The upper face of the lip portion 31 of the outer sleeve 28 of the member 27 is also inclined, to serve as a seat for a sealing or packing ring 33, made of a suitable packing material. A metal sleeve 34 is seated in the annular space between the outer surface of the outer sleeve 28 of the member 27, and the inner working face of the cylinder 10. The lower end of the sleeve 34 is inclined and bears against the packing ring 33. The pressure in the air chamber 19 is imparted, by means of the sleeve 34, to the packing ring 33. An annular plate 35 is mounted upon the upper horizontal wall 30 of the member 27, and serves to retain the sleeve 34 in position.

The lower end of the inner sleeve 29 of the member 27 is also provided with an inwardly extending lip portion 36, the inner face of which engages the outer surface of the tube 21 which is mounted in the top of the piston 11. The upper surface of the lip portion 36 of the sleeve 29 of the member 27 is also inclined, to provide a seat for a sealing or packing ring 37, made of suitable packing material, which serves to prevent leakage between the high pressure chamber 26 and the air chamber 19 in the top of the cylinder 10.

Mounted in the annular space between the outer surface of the tube 21 and the inner surface of the sleeve portion 29 of the member 27, is a ring 38, having an inclined lower face which bears against the packing ring 37. A gland 39 is threaded on the upper end of the tube 21, and a heavy coil spring 40, surrounding the tube 21, is interposed between the ring 38 and the gland 39, for the purpose of compressing the packing ring 37, and simultanously imparting pressure to the lip portion 24 of the cup leather 23, by means of the lip 31 carried at the lower end of the outer sleeve 28 of the member 27.

Adjustment of the pressure imparted by means of the spring 40 is made by advancing or retracting the gland 39 upon the threads provided at the upper end of the tube 21, in a manner to be presently described. Extending upwardly from the top horizontal wall 30 of the member 27 is a tubular stem 41, having mounted therein a check valve 42 of a type commonly employed in the air valves of automobile tires, except that the packing thereof is made of a material which will not be affected by the oil used in the device. Such valves are now well known and readily procurable so that the same need not be further described.

For the purpose of limiting the extent of the movement between the piston 11 and the cylinder 10, whereby the packing member might become disarranged, as well as for the purpose of preventing separation of the piston from the cylinder, there is provided a limiting device comprising a bolt 43, having an enlarged threaded head portion 44, which is mounted in a suitable internal boss 45 at the upper end of the cylinder 10.

The main shank of the bolt 43 has flattened sides, and the lower end portion 46 of said bolt has similarly flattened sides, which, however, are at right angles to the flattened sides of the main shank of the bolt. A small portion of the bolt 43, adjacent the lower end 46, is made cylindrical, but reduced in diameter, as at 47, corresponding to the distance between the flattened sides of the main shank of the bolt and those of the lower end portion thereof.

In the normal assembly of the device, the main shank of the bolt 43 extends through an opening 48 in the gland 39, this opening being shaped similarly to the cross section of the main shank of the bolt, but larger in dimensions, whereby the bolt will be loosely fitting with respect thereto (see Figs. 1 and 2), so as to permit the air to pass between the chambers 19 and 20, provided, respectively, in the upper end of the cylinder 10 and the interior of the piston 11, the tube 21, as hereinbefore set forth, serving as a means of communication between these chambers.

The main shank of the bolt 43 also extends through an opening 55 provided in the head of the piston, which opening is also shaped similarly to the cross section of the main shank of the bolt, but larger in dimensions, to permit the air to pass therethrough.

For the purpose of providing the requisite pressure within the air chambers 19 and 20, there is provided an inlet check valve 49, which is also of a construction similar to that of the type of valve commonly used for inflating automobile tires, the barrel of this valve 49 being mounted in the wall at the upper end of the cylinder 10, and having its outer end provided with a threaded nipple 50, whereby the hose of an air pump may be connected thereto.

A quantity of oil 51 is placed in the device, in the space immediately above the top of the member 27, thus insuring proper lubrication between the inner surface of the cylinder 10 and the parts which slidably engage the same, and also between the outer surface of the tube 21 and the parts which slidably engage the same. This oil may be inserted through an opening 52 provided in the upper portion of the cylinder 10, which is normally closed by means of a threaded plug 53.

A quantity of oil 54 is also placed in the bottom of the air chamber 26, provided by means of the member 27, so that the pressure of the air contained within the chamber 26 is communicated through said oil to the lip portion 24 of the cup leather 23.

After the device is properly mounted upon the vehicle, a sufficient quantity of air is pumped, through the valve 49, into the communicating chambers 19 and 20, provided, respectively, in the upper end of the cylinder 10 and the interior of the piston 11, the pressure depending in each instance upon the weight of the particular vehicle.

It will, of course, be understood that the air within the chamber 26, provided by the member 27 and the parts associated therewith, will initially be of the same pressure as the air in the chamber 19 at the upper end of the cylinder 10.

When, however, the vehicle is subjected to the usual road shocks, the air is compressed to varying degrees within the chambers 19 and 20, in the cylinder 10 and piston 11, respectively, and whenever the pressure within the chamber 19 exceeds that in the chamber 26, a certain quantity of this air of higher pressure will be forced into the chamber 26 provided by the member 27, through the valve stem 41, and will be trapped therein.

It will therefore be apparent that the pressure of the air in the chamber 26 will ordinarily be in excess of that of the air in the chambers 19 and 20. This pressure will be exerted against the lip portion 24 of the cup leather 23, thereby increasing the efficiency of its engagement with the inner working surface of the cylinder 10.

It will be noted, however, that any increase in pressure within the chamber 26 will act against the tension of the spring 40, and thus relieve the downward pressure of the lip portion 31 of the member 27 against the upper surface of the lip portion 24 of the cup leather 23 and vice versa. Consequently, the seal provided by the lip portion 24 of the cup leather 23 will be maintained at all times substantially uniform, notwithstanding variations of pressure within the chamber 19, provided at the upper end of the cylinder 10.

It has been found in practice that, with the foregoing arrangement, the requisite freedom of movement between the piston 11 and the cylinder 10 may be obtained with a minimum of leakage past the cup leather. It will be observed that it will be impossible for a direct leakage of air to occur, by reason of the oil seals provided by means of the oil 51 which is placed immediately above the member 27, and the oil 54 which is placed in the lower portion of the chamber 26. It will also be found that leakage of the oil will be exceedingly small in amount, and it will not be necessary to replenish the supply of the same very frequently. In fact, no more oil will leak past than is necessary for the normal lubrication of the parts.

In the event that it should be found necessary to adjust the pressure exerted by the lip portion 31 of the member 27 against the upper surface of the lip portion 24 of the cup leather 23, it will be necessary merely to remove the bolt 16 by means of which the lower end of the piston 11 is connected to the spring of the vehicle, after which the piston is extended with respect to the cylinder until the lower end portion 46 of the bolt 43 engages the upper wall of the piston adjacent the opening 55, whereupon, by turning the piston 11 a half revolution at a time about its vertical axis, the gland 39 will be rotated upon its threads to change the tension of the spring 40, this action being accomplished by reason of the engagement of the flattened sides of the shank portion of the bolt 43 with the similarly shaped opening 48 in the gland member 39, as hereinbefore described.

There is thus provided a simple and efficient form of pneumatic spring, particularly adaptable for mounting an automobile body with respect to the wheel structure, which is relatively inexpensive to manufacture, and in which leakage of the cushioning air past the piston is eliminated; and this without exerting undue pressure upon the sealing elements, which would interfere with the requisite freedom of movement between the piston and the cylinder.

I claim:

1. In apparatus of the character described, a cylinder; a piston slidably mounted therein; a cup leather secured to the top of the piston, said cup leather having a lip portion extending upwardly and bearing against the inner surface of the cylinder; the upper portion of the cylinder forming an air chamber adapted to contain a volume of air under pressure; a hollow member carried by the piston above the cup leather in which is contained a quantity of air under pressure normally higher than the pressure of the air in the chamber at the top of the cylinder, the pressure of the air in said member being exerted against the lip portion of the cup leather; a portion of said hollow member having a port forming a communication between the interior of said hollow member and the air chamber at the top of the cylinder; and a check valve mounted in said port; said hollow member having a portion bearing downwardly on the top of the lip portion of the cup leather.

2. In apparatus of the character described, a cylinder; a piston slidably mounted therein; a cup leather secured to the top of the piston, said cup leather having a lip portion extending upwardly and bearing against the inner surface of the cylinder; the upper portion of the cylinder forming an air chamber adapted to contain a volume of air under pressure; a hollow member carried by the piston above the cup leather in which is contained a quantity of air under pressure normally higher than the pressure of the air in the chamber at the top of the cylinder, the pressure of the air in said member being exerted against the lip portion of the cup leather; a portion of said hollow member having a port forming a communication between the interior of said hollow member and the air chamber at the top of the cylinder; a check valve mounted in said port; said hollow member having a portion bearing downwardly on the top of the lip portion of the cup leather; a coil spring adapted to impart a downward pressure upon the hollow member; and means for adjusting the tension of coil spring.

3. In apparatus of the character described, a cylinder; a piston slidably mounted therein; a cup leather secured to the top of the piston, said cup leather having a lip portion extending upwardly and bearing against the inner surface of the cylinder; the upper portion of the cylinder forming an air chamber adapted to contain a volume of air under pressure; a hollow member carried by the piston above the cup leather in which is contained a quantity of air under pressure normally higher than the pressure of the air in the chamber at the top of the cylinder, the pressure of the air in said member being exerted against the lip portion of the cup leather; a portion of said hollow member having a port forming a communication between the interior of said hollow member and the air chamber at the top of the cylinder; a check valve mounted in said port; said hollow member having a portion bearing downwardly on the top of the lip portion of the cup leather; a tube secured to the top of the piston and extending upwardly therefrom through the aforesaid hollow member; a coil spring surrounding said tube and adapted to impart a downward pressure upon the hollow member; and means for adjusting the tension of the coil spring by rotating the piston with respect to the cylinder.

4. In apparatus of the character described, a cylinder; a piston slidably mounted therein; a cup leather secured to the top of the piston, said cup leather having a lip portion extending upwardly and bearing against the inner surface of the cylinder; the upper portion of the cylinder forming an air chamber adapted to contain a volume of air under pressure; a hollow member carried by the piston above the cup leather in which is contained a quantity of air under pressure normally higher than the pressure of the air in the chamber at the top of the cylinder, the pressure of the air in said member being exerted against the lip portion of the cup leather; a portion of said hollow member having a port forming a communication between the interior of said hollow member and the air chamber at the top of the cylinder; a check valve mounted in said port; said hollow member having a portion bearing downwardly on the top of the lip portion of the cup leather; packing interposed between said hollow member and the inner surface of the cylinder; a sleeve mounted above said packing having its lower surface bearing against said packing and its upper surface exposed to the pressure of the air contained within the chamber at the top of the cylinder; a tube secured to the top of the piston and extending upwardly therefrom through the aforesaid hollow member; a coil spring surrounding said tube and adapted to impart a downward pressure upon the hollow member; packing surrounding said tube and interposed between the lower end of the spring and a portion of the hollow member; and means for adjusting the tension of the coil spring by rotating the piston with respect to the cylinder.

5. In apparatus of the character described, a cylinder; a piston slidably mounted therein; a cup leather secured to the top of the piston, said cup leather having a lip portion extending upwardly and bearing against the inner surface of the cylinder; the upper portion of the cylinder forming an air chamber adapted to contain a volume of air under pressure; a hollow member carried by the piston above the cup leather in which is contained a quantity of air under pressure normally higher than the pressure of the air in the chamber at the top of the cylinder, the pressure of the air in said member being exerted against the lip portion of the cup leather; a portion of said hollow member having a port forming a communication between the interior of said hollow member and the air chamber at the top of the cylinder; a check valve mounted in said port; said hollow member having a portion bearing downwardly on the top of the lip portion of the cup leather; packing interposed between said hollow member and the inner surface of the cylinder; a sleeve mounted above said packing having its lower surface bearing against said packing and its upper surface exposed to the pressure of the air contained within the chamber at the top of the cylinder; a tube secured to the top of the piston and extending upwardly therefrom through the aforesaid hollow member; a gland threaded on the upper end of said tube; a coil spring surrounding said tube and adapted to impart a downward pressure upon the hollow member; packing surrounding said tube and interposed between the lower end of the spring and a portion of the hollow member; and a limiting device comprising a bolt extending downwardly from the upper end of the cylinder, the main shank portion of said bolt being of non-circular cross section and extending through a similarly shaped opening in the gland which is threaded on the top of the tube, whereby the tension of the coil spring may be adjusted by rotating the piston with respect to the cylinder.

6. In apparatus of the character described, a cylinder; a piston slidably mounted therein; a packing device carried by the top of the piston and bearing against the inner surface of the cylinder; the upper portion of the cylinder forming an air chamber adapted to contain a volume of air under pressure; a hollow member carried by the piston above the packing device in which is contained a quantity of air under pressure normally higher than the pressure of the air in the chamber at the top of the cylinder, the pressure of the air in said member being exerted against the packing device; the piston being hollow, and a tube secured thereto forming a communication between the air chamber provided at the top of the cylinder and the interior of the piston.

7. In apparatus of the character described, a cylinder; a piston slidably mounted therein; a packing device carried by the top of the piston and bearing against the inner surface of the cylinder; the upper portion of the cylinder forming an air chamber adapted to contain a volume of air under pressure; a hollow member carried by the piston above the packing device in which is contained a quantity of air under pressure normally higher than the pressure of the air in the chamber at the top of the cylinder, the pressure of the air in said member being exerted against the packing device, and means for trapping air in said hollow member from the air chamber in the top of the cylinder when the pressure in said air chamber exceeds that in the hollow member; the piston being hollow, and a tube secured thereto forming a communication between the air chamber provided at the top of the cylinder and the interior of the piston.

8. In apparatus of the character described, a cylinder; a piston slidably mounted therein; a cup leather secured to the top of the piston, said cup leather having a lip portion extending upwardly and bearing against the inner surface of the cylinder; the upper portion of the cylinder forming an air chamber adapted to contain a volume of air under pressure; a hollow member carried by the piston above the cup leather in which is contained a quantity of air under pressure normally higher than the pressure of the air in the chamber at the top of the cylinder, the pressure of the air in said member being exerted against the lip portion of the cup leather; the piston being hollow, and a tube secured thereto forming a communication between the air chamber provided at the top of the cylinder and the interior of the piston.

9. In apparatus of the character described, a cylinder; a piston slidably mounted therein; a cup leather secured to the top of the piston, said cup leather having a lip portion extending upwardly and bearing against the inner surface of the cylinder; the upper portion of the cylinder forming an air chamber adapted to contain a volume of air under pressure; a hollow member carried by the piston above the cup leather in which is contained a quantity of air under pressure normally higher than the pressure of the air in the chamber at the top of the cylinder, the pressure of the air in said member being exerted against the lip portion of the cup leather; a portion of said hollow member having a port forming a communication between the interior of said hollow member and the air chamber at the top of the cylinder; a check valve mounted in said port; the piston being hollow, and a tube secured thereto forming a communication between the air chamber provided at the top of the cylinder and the interior of the piston.

10. In apparatus of the character described, a cylinder, a piston slidably mounted therein; a cup leather secured to the top of the piston, said cup leather having a lip portion extending upwardly and bearing against the inner surface of the cylinder; the upper portion of the cylinder forming an air chamber adapted to contain a volume of air under pressure; a hollow member carried by the piston above the cup leather in which is contained a quantity of air under pressure normally higher than the pressure of the air in the chamber at the top of the cylinder, the pressure of the air in said member being exerted against the lip portion of the cup leather; a portion of said hollow member having a port forming a communication between the interior of said hollow member and the air chamber at the top of the cylinder; a check valve mounted in said port; said hollow member having a portion bearing downwardly on the top of the lip portion of the cup leather; the piston being hollow, and a tube secured thereto forming a communication between the air chamber provided at the top of the cylinder and the interior of the piston.

11. In apparatus of the character described, a cylinder; a piston slidably mounted therein; a cup leather secured to the top of the piston, said cup leather having a lip portion extending upwardly and bearing against the inner surface of the cylinder; the upper portion of the cylinder forming an air chamber adapted to contain a volume of air under pressure; a hollow member carried by the piston above the cup leather in which is contained a quantity of air under pressure normally higher than the pressure of the air in the chamber at the top of the cylinder, the pressure of the air in said member being exerted against the lip portion of the cup leather; a portion of said hollow member having a port forming a communication between the interior of said hollow member and the air chamber at the top of the cylinder; a check valve mounted in said port; said hollow member having a portion bearing downwardly on the top of the lip portion of the cup leather; a coil spring adapted to impart a downward pressure upon the hollow member; means for adjusting the tension of said coil spring; the piston being hollow, and a tube secured thereto forming a communication between the air chamber provided at the top of the cylinder and the interior of the piston.

12. In apparatus of the character described, a cylinder; a piston slidably mounted therein, a cup leather secured to the top of the piston, said cup leather having a lip portion extending upwardly and bearing against the inner surface of the cylinder; the upper portion of the cylinder forming an air chamber adapted to contain a volume of air under pressure; a hollow member carried by the piston above the cup leather in which is contained a quantity of air under pressure normally higher than the pressure of the air in the chamber at the top of the cylinder, the pressure of the air in said member being exerted against the lip portion of the cup leather; a portion of said hollow member having a port forming a communication between the interior of said hollow member and the air chamber at the top of the cylinder; a check valve mounted in said port; said hollow member having a portion bearing downwardly on the top of the lip portion of the cup leather; a tube secured to the top of the piston and extending upwardly therefrom through the aforesaid hollow member; a coil spring surrounding said tube and adapted to impart a downward pressure upon the hollow member; and means for adjusting the tension of the coil spring by rotating the piston with respect to the cylinder; the piston being hollow, and the tube secured thereto forming a communication between the air chamber provided at the top of the cylinder and the interior of the piston.

13. In apparatus of the character described, a cylinder; a piston slidably mounted therein; a cup leather secured to the top of the piston, said cup leather having a lip portion extending upwardly and bearing against the inner surface of the cylinder; the upper portion of the cylinder forming an air chamber adapted to contain a volume of air under pressure; a hollow member carried by the piston above the cup leather in which is contained a quantity of air under pressure normally higher than the pressure of the air in the chamber at the top of the cylinder, the pressure of the air in said member being exerted against the lip portion of the cup leather; a portion of said hollow member having a port forming a communication between the interior of said hollow member and the air chamber at the top of the cylinder; a check valve mounted in said port; said hollow member having a portion bearing downwardly on the top of the lip portion of the cup leather; packing interposed between said hollow member and the inner surface of the cylinder; a sleeve mounted above said packing having its lower surface bearing against said packing and its upper surface exposed to the pressure of the air contained within the chamber at the top of the cylinder; a tube secured to the top of the piston and extending upwardly therefrom through the aforesaid hollow member; a coil spring surrounding said tube and adapted to impart a downward pressure upon the hollow member; packing surrounding said tube and interposed between the lower end of the spring and a portion of the hollow member; and means for adjusting the tension of the coil spring by rotating the piston with respect to the cylinder; the piston being hollow, and the tube secured thereto forming a communication between the air chamber provided at the top of the cylinder and the interior of the piston.

14. In apparatus of the character described, a cylinder; a piston slidably mounted therein; a cup leather secured to the top of the piston, said cup leather having a lip portion extending upwardly and bearing against the inner surface of the cylinder; the upper portion of the cylinder forming an air chamber adapted to contain a volume of air under pressure; a hollow member carried by the piston above the cup leather in which is contained a quantity of air under pressure normally higher than the pressure of the air in the chamber at the top of the cylinder, the pressure of the air in said member being exerted against the lip portion of the cup leather; a portion of said hollow member having a port forming a communication between the interior of said hollow member and the air chamber at the top of the cylinder; a check valve mounted in said port; said hollow member having a portion bearing downwardly on the top of the lip portion of the cup leather; packing interposed between said hollow member and the inner surface of the cylinder; a sleeve mounted above said packing having its lower surface bearing against said packing and its upper surface exposed to the pressure of the air contained within the chamber at the top of the cylinder; a tube secured to the top of the piston and extending upwardly therefrom through the aforesaid hollow member; a gland threaded on the upper end of said tube; a coil spring surrounding said tube and adapted to impart a downward pressure upon the hollow member; packing surrounding said tube and interposed between the lower end of the spring and a portion of the hollow member; and a limiting device comprising a bolt extending downwardly from the upper end of the cylinder, the main shank portion of said bolt being of non-circular cross section and extending through a similarly shaped opening in the gland which is threaded on the top of the tube, whereby the tension of the coil spring may be adjusted by rotating the piston with respect to the cylinder; the piston being hollow, and the tube secured thereto forming a communication between the air chamber provided at the top of the cylinder and the interior of the piston.

RICHARD SEFTON.